2 Sheets--Sheet 1.

S. COOK.
Improvement in Horse Hay-Forks.

No. 131,394. Patented Sep. 17, 1872.

Witnesses:
John H. Mills
Wm. S. Holliday

Inventor:
Saml. Cook,
by his attys,
Clayton & Co.

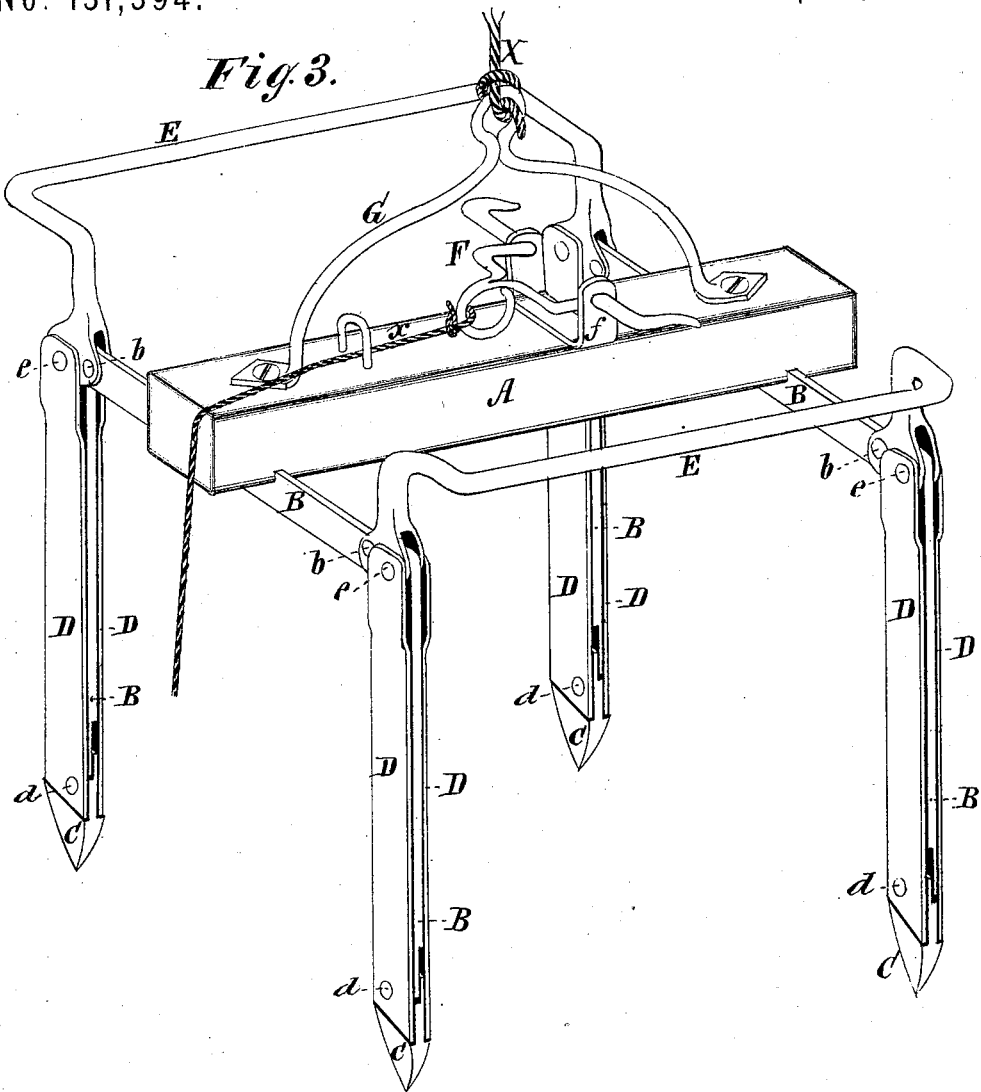

UNITED STATES PATENT OFFICE.

SAMUEL COOK, OF HARRISON, ILLINOIS.

IMPROVEMENT IN HORSE HAY-FORKS.

Specification forming part of Letters Patent No. 131,394, dated September 17, 1872.

*To all whom it may concern:*

Be it known that I, SAMUEL COOK, of Harrison, in the county of Winnebago and in the State of Illinois, have invented a certain new and useful Double-Grappling Hay-Fork; and I do hereby declare that the following is a full, clear, and exact description thereof, reference being had to the accompanying drawing and to the letters of reference marked thereon.

The nature of my invention consists in constructing a double-grappling horse hay-fork with a head-block, to each end of which are secured two arches or U-shaped frames, on the ends of which the tines or points are pivoted, as well as the leaves and levers by which the tines or points are operated. To secure said levers a trip-hook, to be tripped by a rope, is properly fixed to the top of the head-block. A stout metal bail, by which to elevate and lower the fork, is suitably attached to the head-block; all of which will more fully hereinafter appear.

To enable others skilled in the art to make and use my invention, I will now describe its construction and operation more specifically.

Figure 1:
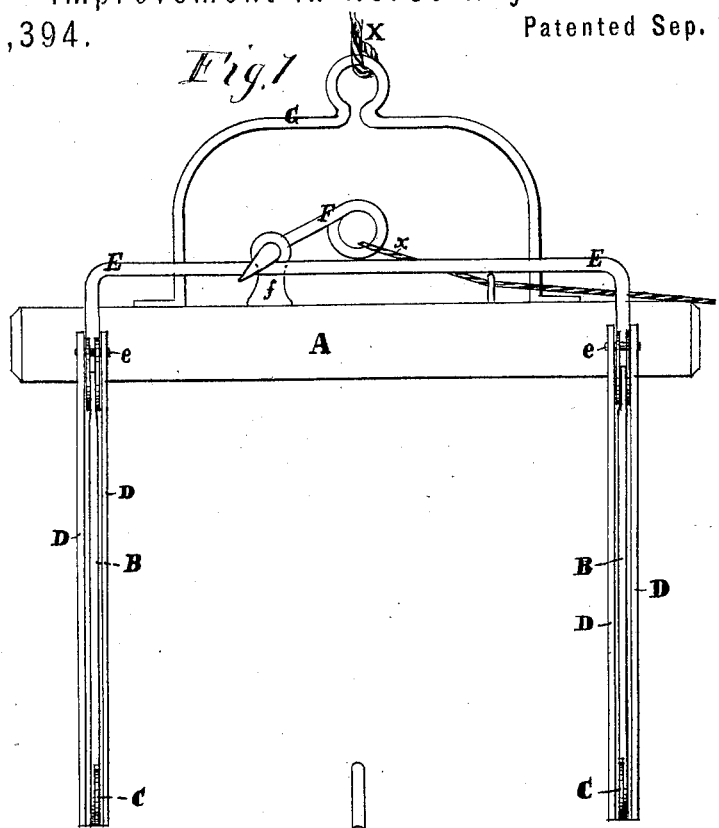
Figure 2:
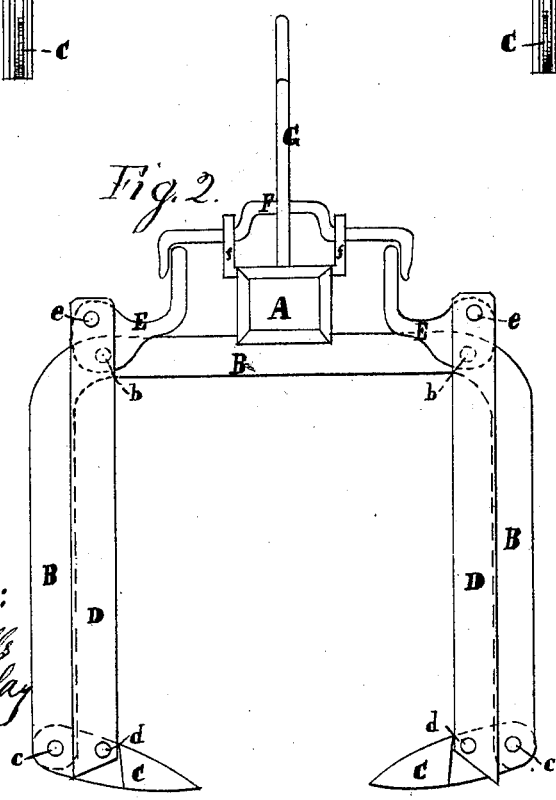

In the drawing, Figure 1 is a side elevation of my invention with the parts adjusted as in lifting a load of hay. Fig. 2 is an end view of the same, and Fig. 3 represents a perspective view of my invention with the tines or points extended, ready to be forced down into the hay that is to be lifted.

A is the head-block. B are the metal U-shaped frames, suitably fixed, one at each end, to the head-block A. These frames B are made of flat and thin pieces of metal, as shown in the drawing. At the ends $c$ of each frame B I pivot the tines or points C. The points C are each operated by two leaves, D, which points are pivoted at $d$ to the leaves D, and extend up one on each side of each of the ends of the frames B, as illustrated in Fig. 1, and pivoted at $e$ to the levers E, which are pivoted at $b$ on the frames B. I have used one leaf, D, to a tine, C, but I prefer to use two instead of one, as I thereby secure greater strength and rigidity. It will be seen that each of the levers E is double, and operates two tines or points, C, at once. F is the trip-hook, resting in standard $f$, that is conveniently secured to the top of the head-block A, the ends of hook F holding the levers E and its ring-head, (see Fig. 1,) furnishing a convenient hold for the trip-rope $x$. G is the bail, firmly fastened to the top of the head-block A with a loop, wherein the lifting-rope X is fastened.

To operate the fork constructed as above set forth, when the fork has been properly mounted on a block, and the horse-power applied, the fork is lowered from its elevation, with the trip-hook F turned up so as to allow the levers E to be turned from the head-block A on their pivots $b$, and force the tines or points C, through means of leaves D, to a vertical position. The fork, as it descends onto the hay to be lifted, is taken hold of, and forced by hand into the hay; then raised a little, and at the same time the levers E are turned toward the head-block A sufficiently far to allow the points of the trip-hook F to secure the said levers. By this movement the fork is loaded, and the tines or points C secured in a horizontal position, as shown in Fig. 2. The fork is now elevated into the desired position, and then trip-rope $x$ is pulled, thereby tripping hook F, and permitting the weight of the load of hay in the fork to force down the points C, and the hay be properly disposed of.

Having thus fully described my invention what I claim therein as new, and desire to secure by Letters Patent, is—

1. The double levers E, leaves D, and tines or points C, in combination with the U-shaped metal frames B, when constructed and operating substantially in the manner and for the purposes set forth.

2. The trip-hook F $f$, in combination with the head-block A and double levers E, when constructed substantially as described, and for the purposes specified.

3. The head-block A, bail G, and trip-hook F, in combination with the double levers E, leaves D, and points C, when constructed and operating substantially in the manner and for the purposes specified.

In testimony that I claim the above-described certain new and useful double-grappling hay-fork I have hereunto signed my name this 26th day of June, 1872.

SAMUEL COOK.

Witnesses:
LEWIS LIGHTHART,
GEORGE LIGHTHART.